R. G. CATOR.
FAUCET.
APPLICATION FILED FEB. 24, 1909.
951,267.
Patented Mar. 8, 1910.
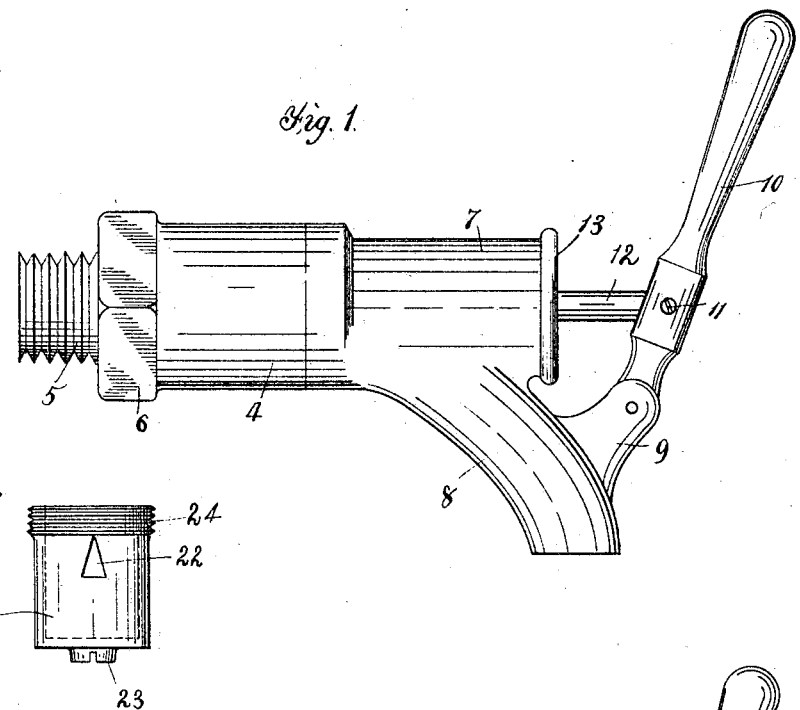
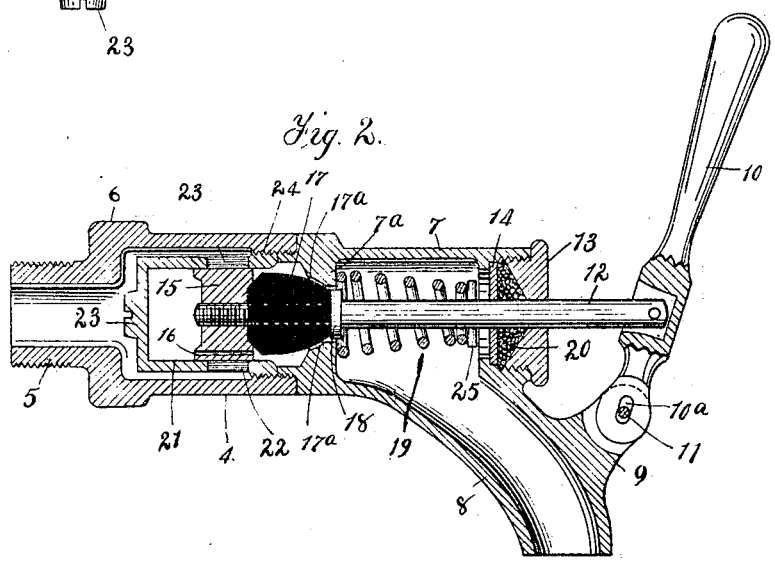
Witnesses
Chas. F. Bassett
M. A. Milord
Inventor
R. G. Cator
By Frederick Benjamin
Attorney

UNITED STATES PATENT OFFICE.

RICHARD G. CATOR, OF PALMYRA, NEW YORK.

FAUCET.

951,267.

Specification of Letters Patent. Patented Mar. 8, 1910.

Application filed February 24, 1909. Serial No. 479,735.

*To all whom it may concern:*

Be it known that I, RICHARD G. CATOR, a citizen of the United States, residing at Palmyra, in the county of Wayne and State of New York, have invented certain new and useful Improvements in Faucets, of which the following is a specification.

My invention relates to improvements in that class of faucets in which closure is effected automatically through the combined action of water-pressure and a coiled expansion spring.

The object of the improvements which form the subject matter of this application is to produce a self-closing faucet having the following principal advantages:—The enforced gradual movement of the faucet lever which operates the piston, whereby the operator may draw any size stream and stop at any desired point with equal facility irrespective of the liquid pressures. A faucet so constructed as to insure a long life and prevent leakage around the valve and its seat. A faucet in which the operator does not have to contend with the pressure of the flowing liquid. A faucet the essential parts of which may be so adjusted as to decrease the flow of liquid due to a high pressure. A construction in which water hammer in faucet or pipes is prevented and one in which the parts are readily accessible and easily repaired.

In the accompanying drawing, I have illustrated my invention in a preferred form in the following views:—

Figure 1 is a side elevation of my improved faucet in its closed position; Fig. 2 is a longitudinal section through said faucet in closed position; Fig. 3 is a detail of an inner cylinder which forms an important feature of my invention.

Referring to the details of the drawing 4 represents a nipple which is formed with an externally threaded extension 5, a squared portion 6, and is adapted to be screwed upon the faucet body 7. This body is formed with a discharge nozzle 8 from which projects a lug 9 on which is pivoted a lever 10, the pivot pin 11 passing through a slot 10ª in the lever. Pivotally connected with this lever is a valve-rod 12 which passes through a suitable bearing in a gland 13 which is screwed into the outer end of the body 7, and also through a loose washer 14 which is seated in the said body.

15 represents a piston which is screwed upon the reduced inner end of the rod 12 and has extending axially therethrough a small port 16. Mounted on the rod 12 between the piston 15 and a washer 18 is a rubber valve 17 which seats upon the valve-seat 17ª formed on the inner walls of the faucet to cover and uncover the passageway through the latter. Surrounding the rod 12 is an expansion coil-spring 19 one end of which bears against an annular shoulder 7ª formed on the inner walls of the faucet-body, and the other end against a pin 25 which passes through the rod 12. The gland 13 is chambered on its under side to provide for the insertion of packing 20 which is expanded and held under pressure against the washer 14 by screwing up the gland.

21 represents a cup-shaped cylinder which forms an important feature of my invention. This member is of less cross diameter than the corresponding diameter of the nipple 4 thus leaving an annular passageway between the inner walls of the nipple and the outer walls of the cylinder. The inner walls of the cylinder are ground to make a sliding fit for the piston 15 which is arranged therein. Through the walls of this cylinder are one or more triangular-shaped slots 22 the bases of which are toward the closed end or bottom of the cylinder on which a slotted boss 23 is provided to facilitate the adjustment of said cylinder in the nipple. The cylinder is externally threaded around its open end as at 24 to engage the female threads on the inner end of the nipple.

From the construction shown and described, it will be apparent that the piston 15 may be adjusted relative to the ports 22 in the cylinder, so as to entirely or only partially uncover same as may be desired. The adjustment of the piston on the stem 12 also controls the position of the valve 17 so that the latter may be caused to travel a greater or less distance relative to its seat after closing of the ports, the greater travel being especially desired under high water pressure.

Some of the peculiar advantages growing out of the invention disclosed may be summarized as follows:—In opening the faucet, the hydraulic action of the liquid escaping through the hole 16 in the piston from between the cylinder head and piston, causes the lever to move gradually, thus allowing the operator to stop at any point desired. The ports 22 remaining covered until after the valve 17 leaves its seat, makes it easy to control the valve lever. The valve when open, if held in a central position with liquid flowing in front of same past its conical face, assists the lever against the reaction of the spring, which is at its greatest tension at this time. The valve is far enough removed from the seat, before the flow of water through the ports, equals the size of the passage, to prevent its being forced violently upon its back seat. The hydraulic relief through the hole in the piston prevents too rapid closing of the valve, and avoids water hammer. In closing the faucet the momentum of the water through the pipe is checked gradually, because the piston closes the triangular ports from base to apex. The water pressure coming on the sides of the piston, avoids pressure from the rear. The piston rod, being guided at both ends, causes the valve to always seat in the same position, insuring a longer life, and more perfect fit. As the piston does not fit tightly in the cylinder, the slight leakage finally assists the spring in seating the valve.

The action of the various parts of my improved faucet is so apparent from the construction that further description would seem superfluous.

Having thus described my invention what I claim as new, is:—

1. In a faucet having a body and a discharge nozzle, an adjustable cylinder arranged in said body and having lateral ports therein, an adjustable piston slidably mounted in said cylinder and adapted to control said ports, a valve in said cylinder, and a lever for operating said piston and valve.

2. In a faucet having a body and a discharge nozzle, an adjustable cup-shaped cylinder arranged in said body and having therein lateral ports of varying area, an adjustable piston slidably mounted in said cylinder and adapted to control said ports, a valve in said cylinder, and common means for operating said piston and valve.

3. In a faucet having a body and a discharge opening and nozzle, a cylinder adjustably arranged in said body and having therein triangular ports, a piston mounted in said cylinder and adapted to control said ports, a valve arranged to control said discharge opening, and a lever for operating said piston and valve.

4. In a faucet having a body and a discharge nozzle, a cup-shaped cylinder adjustably arranged in said body and having lateral ports therein, a rod mounted in said body, a piston on said rod adapted to control said ports, a valve on said rod adapted to control the passage of fluid through said faucet, and means for operating said rod.

In testimony whereof I affix my signature in the presence of two witnesses.

RICHARD G. CATOR.

Witnesses:
JOHN E. DE VOIST,
LEON CATOR.